(12) United States Patent
Miura

(10) Patent No.: US 7,989,387 B2
(45) Date of Patent: *Aug. 2, 2011

(54) PROCESS FOR PRODUCING METAL OXIDE PARTICLE AND EXHAUST GAS PURIFYING CATALYST

(75) Inventor: Masahide Miura, Imasato (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1259 days.

This patent is subject to a terminal disclaimer.

(21) Appl. No.: 10/593,629

(22) PCT Filed: Apr. 27, 2005

(86) PCT No.: PCT/JP2005/008458
§ 371 (c)(1),
(2), (4) Date: Sep. 21, 2006

(87) PCT Pub. No.: WO2005/102523
PCT Pub. Date: Nov. 3, 2005

(65) Prior Publication Data
US 2007/0197379 A1    Aug. 23, 2007

(30) Foreign Application Priority Data

Apr. 27, 2004 (JP) ................. 2004-131433
Apr. 27, 2004 (JP) ................. 2004-131637

(51) Int. Cl.
*B01J 23/10* (2006.01)
(52) U.S. Cl. ...................... 502/304; 502/300
(58) Field of Classification Search ............. 502/300, 502/304
See application file for complete search history.

(56) References Cited

U.S. PATENT DOCUMENTS

| 4,422,960 A * | 12/1983 | Shiroto et al. ............... 502/206 |
| 4,448,895 A | 5/1984 | Ono et al. |
| 4,981,825 A | 1/1991 | Pinnavaia et al. |
| 5,182,249 A | 1/1993 | Wang et al. |

(Continued)

FOREIGN PATENT DOCUMENTS

CN    1060793 A    5/1992

(Continued)

OTHER PUBLICATIONS

John Dalton Wright et al., Sol-Gel Materials: Chemistry and Applications, 2001, CRC Press, Sect 1.4.

(Continued)

*Primary Examiner* — Alexa D. Neckel
*Assistant Examiner* — Nicholas A. Smith
(74) *Attorney, Agent, or Firm* — Oliff & Berridge, PLC

(57) ABSTRACT

The present invention provides an exhaust gas purifying catalyst and a process for producing a metal oxide particle comprising multiple species of metal oxides and capable of satisfactorily exerting the properties of respective metal oxides. A process of the present invention comprises providing a sol containing at least a population of first colloid particles and a population of second colloid particles differing in the isoelectric point with each other; adjusting the pH of the sol to be closer to the isoelectric point of the population of first colloid particles than to the isoelectric point of the population of second colloid particles, thereby aggregating the population of first colloid particles; adjusting the pH of the sol, thereby aggregating the population of second colloid particles onto the population of first colloid particles aggregated; and drying and firing the obtained aggregate.

12 Claims, 5 Drawing Sheets

U.S. PATENT DOCUMENTS

| | | | |
|---|---|---|---|
| 5,232,889 A | 8/1993 | Blanchard et al. | |
| 5,334,570 A | 8/1994 | Beauseigneur et al. | |
| 5,346,875 A | 9/1994 | Wachter et al. | |
| 5,352,646 A | 10/1994 | Blanchard et al. | |
| 5,439,865 A | 8/1995 | Abe et al. | |
| 5,492,870 A | 2/1996 | Wilcox et al. | |
| 5,607,892 A | 3/1997 | Chopin et al. | |
| 5,753,581 A | 5/1998 | Beckmeyer et al. | |
| 6,083,868 A | 7/2000 | Yoshida et al. | |
| 6,358,880 B1 | 3/2002 | Hedouin et al. | |
| 6,528,451 B2 | 3/2003 | Brezny et al. | |
| 6,773,814 B2 | 8/2004 | Schumacher et al. | |
| 6,911,414 B2 | 6/2005 | Kimura et al. | |
| 7,314,846 B2 | 1/2008 | Kuno | |
| 7,384,888 B2 | 6/2008 | Kuno | |
| 2002/0049137 A1 | 4/2002 | Morikawa et al. | |
| 2002/0098975 A1 | 7/2002 | Kimura et al. | |
| 2003/0007926 A1 | 1/2003 | Jiang et al. | |
| 2004/0082468 A1 | 4/2004 | Suzawa et al. | |
| 2004/0087440 A1 | 5/2004 | Kuno | |
| 2004/0186016 A1 | 9/2004 | Bog et al. | |
| 2005/0059547 A1 | 3/2005 | Kuno | |
| 2007/0129246 A1 | 6/2007 | Miura | |
| 2007/0179052 A1 | 8/2007 | Hirabayashi et al. | |
| 2007/0197373 A1 | 8/2007 | Miura et al. | |
| 2007/0197379 A1 | 8/2007 | Miura | |
| 2008/0051283 A1 | 2/2008 | Miura | |

FOREIGN PATENT DOCUMENTS

| | | |
|---|---|---|
| DE | 94 03 581 U1 | 6/1994 |
| EP | 0 430 744 A | 6/1991 |
| EP | 0 524 643 A | 1/1993 |
| EP | A-8-103650 | 4/1996 |
| EP | 1 175 935 A | 1/2002 |
| EP | 1 284 277 A1 | 2/2003 |
| EP | 1 371 415 A1 | 12/2003 |
| EP | 1 415 956 A2 | 5/2004 |
| EP | 1 516 855 A1 | 3/2005 |
| EP | 1 579 912 A2 | 9/2005 |
| FR | 2 836 067 A | 8/2003 |
| JP | A-03-277060 | 12/1991 |
| JP | A-06-279027 | 10/1994 |
| JP | A-8-109020 | 4/1996 |
| JP | A-8-109021 | 4/1996 |
| JP | A-9-255331 | 9/1997 |
| JP | A-10-194742 | 7/1998 |
| JP | A-10-258232 | 9/1998 |
| JP | A-2000-319019 | 11/2000 |
| JP | A-2001-89143 | 4/2001 |
| JP | A-2002-110261 | 4/2002 |
| JP | A-2002-331238 | 11/2002 |
| JP | A-2002-346386 | 12/2002 |
| JP | A-2003-117393 | 4/2003 |
| JP | A-2003-277060 | 10/2003 |
| JP | A-2004-074138 | 3/2004 |
| JP | A-2005-254047 | 9/2005 |
| JP | A-2005-313024 | 11/2005 |
| JP | A-2005-313028 | 11/2005 |
| JP | A-2005-314134 | 11/2005 |
| KR | 10-0295168 B1 | 9/2001 |
| WO | WO 03/037506 A1 | 5/2003 |
| WO | WO 2005/102933 A2 | 11/2005 |
| WO | WO 2007/113674 A2 | 10/2007 |

OTHER PUBLICATIONS

U.S. Appl. No. 10/588,603, filed Aug. 7, 2006 in the name of Takeshi Hirabayashi et al.

Office Action (Non-Final Rejection) issued in U.S. Appl. No. 10/588,603 on Aug. 19, 2008.

Office Action (Non-Final Rejection) issued in U.S. Appl. No. 10/588,603 on Apr. 1, 2009.

Notice of Allowance issued in U.S. Appl. No. 10/588,603 on Nov. 24, 2009.

U.S. Appl. No. 10/589,421, filed Aug. 15, 2006 in the name of Masahide Miura.

Office Action (Non-Final Rejection) issued in U.S. Appl. No. 10/589,421 on Sep. 17, 2008.

Office Action (Non-Final Rejection) issued in U.S. Appl. No. 10/589,421 on Apr. 14, 2009.

Notice of Allowance issued in U.S. Appl. No. 10/589,421 on Sep. 18, 2009.

U.S. Appl. No. 10/589,669, filed Aug. 16, 2006 in the name of Masahide Miura.

Office Action (Requirement for Restriction/Election) issued in U.S. Appl. No. 10/589,669 on Aug. 12, 2008.

Office Action (Non-Final Rejection) issued in U.S. Appl. No. 10/589,669 on Nov. 5, 2008.

Office Action (Final Rejection) issued in U.S. Appl. No. 10/589,669 on Apr. 28, 2009.

Office Action (Non-Final Rejection) issued in U.S. Appl. No. 10/589,669 on Nov. 18, 2009.

U.S. Appl. No. 12/451,089, filed Oct. 26, 2009 in the name of Masahide Miura.

Office Action (Final Office Action) issued in U.S. Appl. No. 10/589,669 on May 19, 2010.

* cited by examiner

PROCESS FOR PRODUCING METAL OXIDE PARTICLE AND EXHAUST GAS PURIFYING CATALYST

TECHNICAL FIELD

The present invention relates to a process for producing a metal oxide particle and, more specifically, the present invention relates to a process for producing a metal oxide particle preferably used as an exhaust gas purifying catalyst by loading a noble metal thereon. Further, present invention relates to an exhaust gas purifying catalyst for an internal combustion engine.

RELATED ART

The exhaust gas from internal combustion engines, such as automobile engines, contains nitrogen oxide ($NO_x$), carbon monoxide (CO), hydrocarbon (HC) and the like. These substances can be purified by an exhaust gas purifying catalyst capable of oxidizing CO and HC and, at the same time, reducing $NO_x$. As for representative exhaust gas purifying catalysts, three-way catalysts where a noble metal such as platinum (Pt), rhodium (Rh) and palladium (Pd) is supported on a porous metal oxide support such as γ-alumina are known.

The metal oxide support may be formed of various materials but, in order to obtain a large surface area, alumina ($Al_2O_3$) has been heretofore generally used. However, in recent years, for accelerating purification of the exhaust gas by using chemical properties of the support, it has been proposed to use various other materials such as ceria ($CeO_2$), zirconia ($ZrO_2$) and titanium ($TiO_2$) in combination with, or not in combination with, alumina.

For example, in order to alleviate the fluctuation of oxygen concentration in the exhaust gas and thereby increase the exhaust gas purifying ability of the three-way catalyst, a material having an oxygen storage capacity (OSC) for storing oxygen when the oxygen concentration in the exhaust gas is high, and releasing oxygen when the oxygen concentration in the exhaust gas is low, is used as a support of the exhaust gas purifying catalyst. A representative material having OSC is ceria.

In order to allow for efficient progress of oxidation of CO and HC and reduction of $NO_x$ by the activity of the three-way catalyst, the air-fuel ratio in the internal combustion engine must be a theoretical air-fuel ratio (stoichiometric air-fuel ratio). Therefore, the fluctuation of oxygen concentration in the exhaust gas is preferably alleviated by a material having OSC to maintain the oxygen concentration in the vicinity of the theoretical air-fuel ratio, so that the three-way catalyst can exert its exhaust gas purifying ability. Furthermore, according to recent studies, it has been found that ceria not only has OSC but also, by virtue of its strong affinity for a noble metal, particularly platinum, can prevent particle growth (sintering) of the noble metal supported thereon.

In this way, ceria has preferred properties for use in an exhaust gas purifying catalyst but sometimes fails in satisfying the heat resistance required in such usage. Accordingly, a method for elevating the heat resistance by forming a solid solution of ceria and zirconia has been developed (see, for example, Japanese Unexamined Patent Publication (Kokai) No. 10-194742 and 6-279027).

Further, Japanese Unexamined Patent Publication (Kokai) No. 2004-74138 discloses a ceria-based particle used as a catalyst support wherein the outer part of the particle is rich in ceria and inner part of the particle is poor in ceria. The reference states that the ceria-based particle suppress particle growth of the noble metal supported thereon due to the outer part of the particle rich in ceria, and provides little capacity of oxygen storing and releasing due to the inner part of the particle poor in ceria. The ceria-based particle is produced by a method of impregnating $ZrO_2$ power or $AlO_2$ powder with aqueous cerium nitrate solution, and firing it; a method of precipitating $ZrO_2$ precursor from zirconium oxynitrate solution, adding aqueous cerium nitrate solution thereto, precipitating $CeO_2$ precursor onto the $ZrO_2$ precursor, and then firing it; and a method of hydrolyzing cerium alkoxide on $ZrO_2$ precursor or $CeO_2$ precursor, and then firing it.

In the case of providing a metal oxide support comprising multiple species of materials and using a combination of the properties thereof as described above, these multiple species of metal oxides particles may be mixed but, if so mixed, a good combination of the properties of these metal oxides may not be attained, because each combined metal oxide particle has a large size.

Also, a substantially uniform metal oxide particle may be obtained from a sol in which multiple different species of colloid particles are mixed, but a uniform mixture does not always yield the best result.

For example, a composite metal oxide obtained by uniformly mixing ceria and zirconia is known to have good OSC and heat resistance, but sometimes does not allow ceria to satisfactorily bring out its property of preventing sintering of noble metal such as platinum. That is, ceria and zirconia both are present on the surface of this composite metal oxide and, therefore, a part of the noble metal is supported on the zirconia portion rather than on the ceria portion and cannot be prevented from sintering, in some cases.

Accordingly, the present invention provides a process for producing a metal oxide particle comprising multiple species of metal oxides and capable of satisfactorily exerting the properties of respective metal oxides.

Further, the present invention provides an exhaust gas purifying catalyst, which can exert a heat resistance improving effect due to $ZrO_2$, and an effect of preventing sintering of a noble metal supported on $CeO_2$ at the same time, by supporting the noble metal on a particulate support comprising a core relatively rich in $ZrO_2$ and a surface layer relatively rich in $CeO_2$.

DISCLOSURE OF INVENTION

The present process for producing a metal oxide particle comprising a core part and a surface layer differing in the composition comprises providing a sol containing at least a population of first colloid particles and a population of second colloid particles differing in the isoelectric point with each other; adjusting the pH of the sol to be closer to the isoelectric point of the population of first colloid particles than to the isoelectric point of the population of second colloid particles, particularly closer to the range of ±1.0, more particularly ±0.5, of the isoelectric point of the population of first colloid particles, thereby aggregating the population of first colloid particles; adjusting the pH of the sol to be closer to the isoelectric point of the population of second colloid particles than to the isoelectric point of the population of first colloid particles, particularly be into the range of ±1.0, more particularly ±0.5, of the isoelectric point of the population of second colloid particles, thereby aggregating the population of second colloid particles onto the population of first colloid particles aggregated; and drying and firing the obtained aggregate.

According to the process of the present invention, a metal oxide particle comprising a core part relatively rich in a component originated in the population of first colloid particles and a surface layer relatively rich in a component originated in the population of second colloid particles can be obtained.

Furthermore, according to the process of the present invention, a metal oxide particle having any particle diameter and having a structure comprising a core part and a surface layer can be obtained. For example, when the population of colloid particles used as a raw material in practice has an average particle diameter of about 5 nm, the average particle diameter of the metal oxide particle produced by the process of the present invention can be made to be 50 nm or less. Accordingly, this metal oxide particle can have an average particle diameter of, for example, less than 10 μm, less than 5 μm, less than 1 μm, less than 500 nm, less than 200 nm, less than 100 nm or less than 50 nm.

The term "relatively rich in" as used herein for the metal oxide comprising a core part and a surface layer is used with respect to the molar fraction based on the total molar number of metals in each of the core part and the surface layer. Accordingly, for example, the "core part relatively rich in a component originated in the population of first colloid particles" means that the molar fraction of a metal constituting this component in the core part is higher than the molar fraction of the same metal in the surface layer.

The term "colloid particles" as used herein means particles which comprise a metal oxide or a metal bonded to oxygen dispersed in a liquid, particularly water, and which produces a metal oxide when the dispersion medium is removed and the residue is fired. The "colloid particles" are generally understood to have a diameter of 1 to 1,000 nm, particularly from 1 to 500 nm. For example, a sol containing colloid particles having a diameter of less than 100 nm or less than 50 nm is available.

The term "sol" as used herein means a dispersion system wherein colloid particles are dispersed in a dispersion medium which is a liquid, and this is sometimes referred to as a colloid solution. The dispersion medium contained in the sol is generally water, but an organic dispersion medium such as alcohol and acetylacetone may be contained, if desired.

In another embodiment of the process of the present invention, the pH of the sol is changed to pass the isoelectric point of the population of first colloid particles, thereby aggregating the population of first colloid particles.

According to this embodiment, the zeta potential of the population of first colloid particles becomes zero when the pH of the sol passes through the isoelectric point of the population of first colloid particles, and therefore, the population of first colloid particles can be unfailingly aggregated.

In another embodiment of the process of the present invention, the pH of the sol is changed to pass the isoelectric point of the population of second colloid particles, thereby aggregating the population of second colloid particles.

According to this embodiment, the zeta potential of the population of second colloid particles becomes zero when the pH of the sol passes through the isoelectric point of the population of second colloid particles, and therefore, the population of second colloid particles can be unfailingly aggregated.

In another embodiment of the process of the present invention, the population of first colloid particles and a population of second colloid particles each is independently selected from the group consisting of alumina, ceria, zirconia and titania colloid particles.

In another embodiment of the process of the present invention, the population of first colloid particles is zirconia, alumina or titania, particularly zirconia, and the population of second colloid particles is ceria.

According to this embodiment, a metal oxide particle comprising a core part relatively rich in zirconia, alumina or titania and a surface layer relatively rich in ceria can be obtained.

When platinum is supported on such a metal oxide particle, good heat resistance attributable to zirconia, alumina or titania, particularly zirconia, can be realized, and an effect of preventing sintering of platinum can be achieved by virtue of ceria.

In this case, the total molar fraction of cerium and zirconium, aluminum or titanium may be at least 85 mol %, particularly at least 90 mol %, more particularly at least 95 mol %, based on the total molar number of metals in the metal oxide particle.

The present exhaust gas purifying catalyst for internal combustion engine comprises a particulate support and a noble metal supported thereon, the particulate support comprising a core part relatively rich in zirconia ($ZrO_2$) and a surface layer relatively rich in ceria ($CeO_2$), the content of $CeO_2$ in the particulate support being 40 to 65 mol %, particularly 45 to 55 mol %.

According to the exhaust gas purifying catalyst of the present invention, in the particulate support, the core part relatively rich in $ZrO_2$ has a suitable volume, and the surface layer relatively rich in $CeO_2$ covers the entire core part to form a layer having a suitable thickness. As a result, the effect of improving heat resistance due to $ZrO_2$ and the effect of preventing sintering of the noble metal due to $CeO_2$ both are preferably exerted at the same time.

In one embodiment of the exhaust gas purifying catalyst of the present invention, the surface layer comprises at least one element selected from the group consisting of alkaline earth metals and rare earths, particularly at least one of Y and Nd.

According to this embodiment, lattice strain of $CeO_2$ increases and it becomes easy to change the valence of Ce ions from 3 to 4 and/or 4 to 3 due to delivery and reception of electrons. Therefore, storage/release properties of oxygen, i.e. OSC, is improved this contributes to an improvement of the catalyst properties.

In one embodiment of the exhaust gas purifying catalyst of the present invention, the core part comprises at least one element selected from the group consisting of alkaline earth metals and rare earths, particularly Y.

According to this embodiment, the heat resistance of the particulate support is improved, though the reason is not clear.

BEST MODE FOR CARRYING OUT THE INVENTION

<Process for Producing Metal Oxide Particle>

Figure 1:
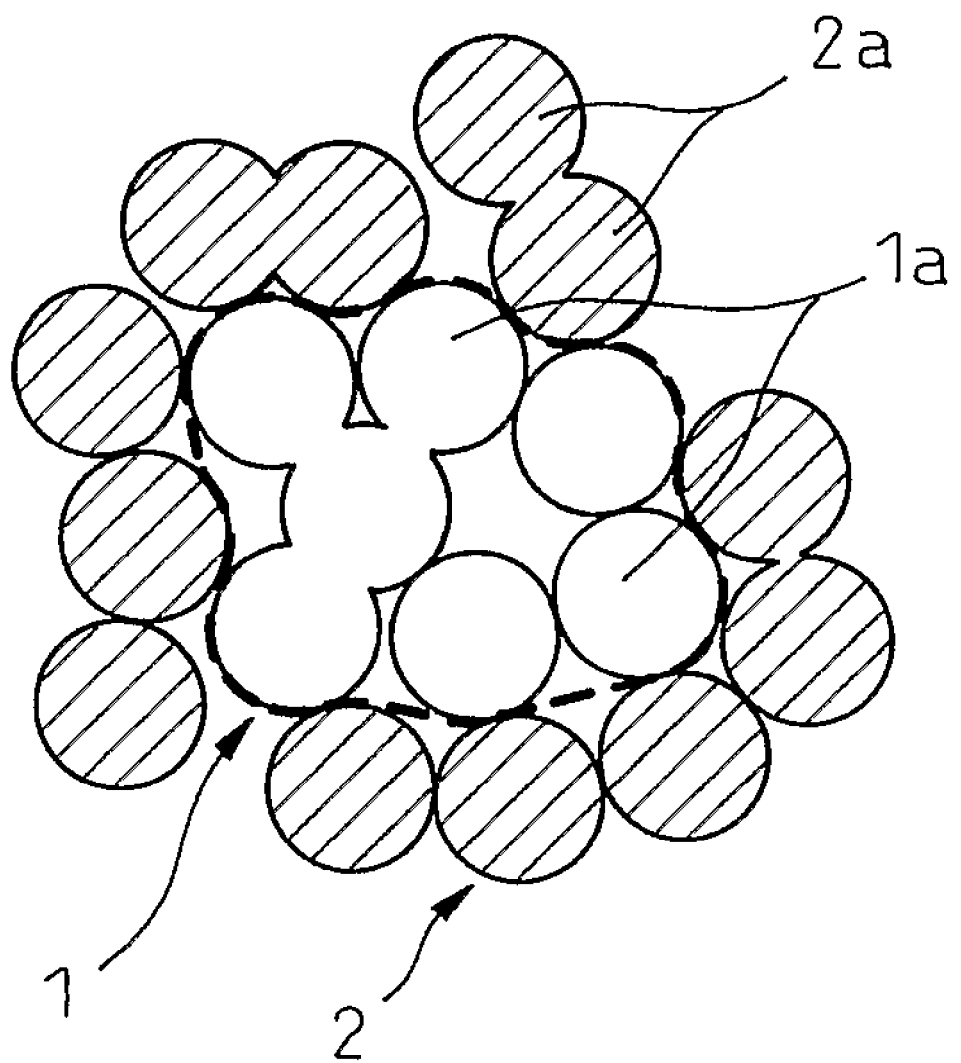
FIG. 1 is a cross-sectional view showing the metal oxide particle produced by the method of the present invention.

The process for producing a metal oxide particle of present invention is described below by referring to FIG. 1. FIG. 1 is a cross-sectional view of a metal oxide particle produced by the process of the present invention.

As shown in FIG. 1, according to the process of the present invention, a metal oxide particle comprising a core part 1 and a surface layer 2 differing in the composition can be produced. More specifically, according to the process of the present invention, in a sol containing at least two populations of colloid particles differing in the isoelectric point from each other, the population of first colloid particles is aggregated and then the population of second colloid particles is aggregated onto the periphery of the population of first aggregated colloid particles, whereby a metal oxide particle comprising a core part 1 mainly composed of a component originated in the population of first colloid particles and a surface layer 2 mainly composed of a component originated in the population of second colloid particles is produced.

In the metal oxide particle shown, the core part 1 and the surface layer 2 each comprises a plurality of primary particles (1a, 2a) originated in the population of first colloid particles and a population of second colloid particles. However, a distinct boundary may or may not be present between respective primary particles. Also, the boundary between the core part 1 and the surface layer 2 may not be necessarily distinct and may appear as a portion where the composition is gradually changing. Furthermore, the boundary part between the core part 1 and the surface layer 2 may be a mixture, particularly a solid solution, of a component originated in the population of first colloid particles and a component originated in the population of second colloid particles. In FIG. 1, the surface layer 2 is shown as if it is discontinuous, but the surface layer may be continuous.

As for the metal oxides constituting the metal oxide particle produced by the process of the present invention, any metal oxide can be selected and a metal oxide which is preferably held in the core part of the metal oxide particle may be selected as a first metal oxide, while selecting, as a second metal oxide, a metal oxide which is preferably exposed to the surface layer of the metal oxide particle. For example, the first metal oxide is preferably zirconia and the second metal oxide is preferably ceria. The zirconia has high heat resistance and the ceria can prevent sintering of platinum when platinum is supported.

When the surface layer or core part of the metal oxide particle of the present invention contains zirconia or ceria, the core or surface layer may contain a metal other than cerium (Ce) and zirconium (Zr), for example, a metal selected from the group consisting of alkaline earth metals and rare earth elements, particularly yttrium (Y). These alkaline earth metals and rare earth elements, particularly yttrium, tend to provide excellent heat resistance to zirconia and ceria.

A noble metal such as platinum, rhodium and palladium is supported on the metal oxide particle obtained by the process of the present invention, and thereby an exhaust gas purifying catalyst can be produced. In the exhaust gas purifying catalyst produced, the noble metal can be supported mainly on the surface layer, because the metal oxide particle obtained by the process of the present invention can have a core part and a surface layer.

The noble metal may be loaded on the metal oxide particle by any known method, for example, by a method of impregnating metal oxide particles with a solution containing a salt and/or a complex salt of noble metal, and drying and then firing it. The amount of the noble metal supported on the metal oxide particle may be from 0.01 to 5 mass %, particularly from 0.1 to 2 mass %, based on the metal oxide particle.

This exhaust gas purifying catalyst may be used not only by shaping the catalyst itself but also by coating it on a monolithic substrate, for example, a ceramic honeycomb.

Respective steps in the process of the present invention are described below.

<Provision of Sol Mixture>

In the process of the present invention, a sol comprising at least a population of first colloid particles and a population of second colloid particles differing in the isoelectric point with each other is provided.

Specific examples of the sol prepared include substances obtained by hydrolyzing and condensing an alkoxide, an acetylacetonate, an acetate or a nitrate of metal. In addition, sols such as alumina sol, zirconia sol, titania sol and ceria sol are a known material and may also be available as commercial products.

The metal oxide sol generally available on the market has a pH different from the isoelectric point of the colloid particle contained therein, so that the colloid particles contained can electrostatically repel each other to prevent aggregation. That is, a sol containing colloid particles having an isoelectric point on the alkali side is stabilized by acidifying the sol (acid-stabilized sol), and a sol containing colloid particles having an isoelectric point on the acidic side is stabilized by alkalifying the sol (alkali-stabilized sol).

The isoelectric point of the colloid particle does not necessarily depend on a material itself constituting the particle, such as oxide, but can be arbitrarily set by the surface modification of colloid particles, particularly by the surface modification of colloid particles with an organic compound. Accordingly, the population of first colloid particles and a population of second metal oxide colloid particles for use in the process of the present invention each may be arbitrarily selected to have an appropriate pH for the present invention. For example, a population of first colloid particles and a population of second colloid particles can be selected to give a difference of 3 or more, particularly 4 or more, more particularly 5 or more, between the isoelectric points of respective populations of colloid particles.

The isoelectric point of colloid particle, which must be known for the process of the present invention, may be determined by any method but can be measured, for example, by an electrophoretic light scattering method.

The sol containing at least two populations of colloid particles, which can be used in the process of the present invention, may be obtained by any method but, in particular, the sol can be obtained by mixing different sols. The mixing ratio of these populations of colloid particles can be arbitrarily determined depending on the desired properties of the metal oxide particle.

In the process of the present invention, the element such as alkaline earth metals and rare earths, which are preferably contained in the metal oxide particle, can be contained in the sol not only as a colloid particle but also as a metal salt such as nitrate.

<Aggregation of First Colloid Particles>

In the process of the present invention, the pH of the sol is then adjusted to be closer to the isoelectric point of the population of first colloid particles than to the isoelectric point of the population of second colloid particles, thereby aggregating the population of first colloid particles.

As described above, the metal oxide sol generally available on the market has a pH distant from the isoelectric point of colloid particle contained, so that the colloid particles can electrostatically repel each other to prevent aggregation. Accordingly, when the pH of a sol containing a population of first colloid particles and a population of second colloid particles is changed to the vicinity of the isoelectric point of the population of first colloid particles as in the present invention, the zeta potential of the population of first colloid particles becomes small and this allows for little generation of electrical repulsion between the particles, whereby aggregation of the population of first colloid particles is accelerated. In this stage, the pH of the sol is relatively different from the isoelectric point of the population of second colloid particles and therefore, the population of second colloid particles has a relatively large zeta potential and is prevented from aggregating.

The pH of the sol can be adjusted by adding any acid or alkali. Examples of the acid which can be used include mineral acids such as nitric acid and hydrochloric acid, and examples of the alkali which can be used include aqueous ammonia and sodium hydroxide. The pH of the sol can also be adjusted by merely mixing multiple species of sols.

The pH of the sol can be adjusted by a method of adding an acid or an alkali to the sol while measuring the pH of the sol by a pH meter, or a method of predetermining the amount of acid or alkali necessary for the pH adjustment by using a previously sampled sol, and adding an acid or alkali to the entire sol in the predetermined amount.

<Aggregation of Second Colloid Particles>

In the process of the present invention, the pH of the sol is then adjusted to be closer to the isoelectric point of the population of second colloid particles than to the isoelectric point of the population of first colloid particles, thereby aggregating the population of second colloid particles onto the periphery of the population of first colloid particles aggregated.

When the pH of the sol containing the population of first colloid particles aggregated is thus changed to the vicinity of the isoelectric point of the population of second colloid particles, the zeta potential of the population of second colloid particles becomes small and this allows for little generation of electrical repulsion between the particles, whereby aggregation of the population of second colloid particles is accelerated. At this stage, the pH of the sol is relatively different from the isoelectric point of the population of first colloid particles, so that the population of first colloid particles can be prevented from aggregation and the population of second colloid particles can deposit onto the periphery of the population of first colloid particles.

The pH of the sol can be adjusted in the same manner as in the above-described aggregation of the first metal oxide.

<Drying and Firing of Aggregate>

The thus-obtained aggregate is dried and fired, whereby a metal oxide particle comprising a core part mainly composed of a component originated in the population of first colloid particles and a surface layer mainly composed of a component originated in the population of second colloid particles can be produced.

The removal and drying of dispersion medium from sol may be performed by any method at any temperature. For example, this can be achieved by placing the sol in an oven at 120° C. The material obtained by removing and drying the dispersion medium from the sol is fired, whereby the metal oxide particle can be obtained. The firing may be performed at a temperature generally employed for producing metal oxides, for example, at a temperature of 500 to 1,100° C.

<Exhaust Gas Purifying Catalyst>

Figure 2:
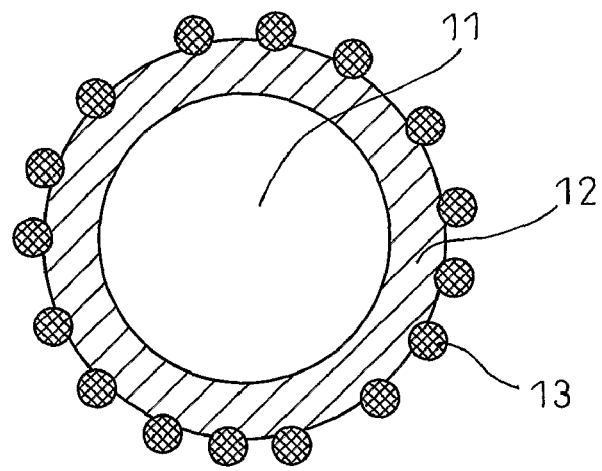
FIG. 2 is a cross-sectional view showing a support of the present invention and a noble metal supported thereon.

As shown in FIG. 2, in an optimum aspect of the exhaust gas purifying catalyst of the present invention, $CeO_2$ constituting a surface layer 12 of particulate support covers an entire core part 22 formed of $ZrO_2$ in a proper thickness, and a noble metal 13 (Pt) is supported on the particulate support. Furthermore, the particulate support preferably has a small particle diameter. It was confirmed that the exhaust gas purifying catalyst comprising the particulate support and the noble metal 3 supported thereon had an excellent exhaust gas purifying performance. The same effect is exerted in a monolith catalyst obtained by coating the particulate support on a honeycomb substrate.

The particulate support used in the exhaust gas purifying catalyst of the present invention can be produced by the present process for producing metal oxide particle comprising a core part and surface layer differing in composition.

In the process for producing a particulate support used in the exhaust gas purifying catalyst of the present invention, it is preferable to use $CeO_2$ and $ZrO_2$ sols comprising $CeO_2$ and $ZrO_2$ colloid particles having a particle diameter as small as possible such that the particle diameter of the resulting particulate support is small. The particulate support having a smaller particle diameter has a larger specific surface area. Also, the particle diameter of the noble metal to be supported on the particulate support is preferably controlled to be small, thereby increasing the specific surface area thereof.

An increase in the specific surface area of the particulate support makes it possible to increase the amount of the noble metal which can be supported, even if the same weight of the particulate support is used. Increase of the specific surface area of the noble metal makes it possible to increase the area of the noble metal which is contacted with the exhaust gas, even if the same weight of the noble metal is used. These increases of the surface area can improve exhaust gas purifying performance, even if a smaller amount of the particulate support, in combination with the noble metal, is used.

The noble metal can be supported by dispersing the particulate support in distilled water and adding a noble metal solution, followed by stirring, drying and further firing. The noble metal to be supported is preferably at least one selected from the group consisting of Pt, Pd, Rh, Ir and Au, more preferably at least one selected from the group consisting of Pt, Pd and Rh, and Pt is most preferable.

The present invention is described in greater detail below by referring to Examples, but the present invention is not limited thereto.

EXAMPLES 1 TO 6 AND COMPARATIVE EXAMPLES 1 TO 4

In the following tests, the pH of the sol was measured by using a pH meter, wherein the pH meter electrode was directly dipped in the sol.

Example 1

In this Example, a metal oxide particle comprising a core part relatively rich in zirconia and a surface layer relatively rich in ceria is obtained from an alkali-stabilized zirconia aqueous sol and an acid-stabilized ceria aqueous sol.

An alkali-stabilized zirconia aqueous sol (isoelectric point: pH 3.5) and an acid-stabilized ceria aqueous sol (isoelectric point: pH 8.5) were mixed to give a molar ratio of 1:1 between zirconia ($ZrO_2$) and ceria ($CeO_2$). To this mixed sol, an aqueous nitric acid ($HNO_3$) solution was added dropwise with stirring to adjust the pH to 3.0, thereby aggregating zirconia. Thereafter, an aqueous ammonia ($NH_3$) solution was added dropwise to this mixed sol with stirring to adjust the pH to 10, thereby aggregating ceria.

The resulting mixed sol was dried at 120° C. for 24 hours, and the dried product was fired at 700° C. for 5 hours to obtain a metal oxide particle.

Example 2

In this Example, a metal oxide particle comprising a core part relatively rich in titania and a surface layer relatively rich in ceria is obtained from an alkali-stabilized titania aqueous sol and an acid-stabilized ceria aqueous sol.

An alkali-stabilized titania aqueous sol (pH at isoelectric point: 3.9) and an acid-stabilized ceria aqueous sol (isoelectric point: pH 8.5) were mixed to give a molar ratio of 1:1 between titania ($TiO_2$) and ceria ($CeO_2$). To this mixed sol, an aqueous nitric acid solution was added dropwise with stirring to adjust the pH to 3.0, thereby aggregating titania. Thereafter, an aqueous ammonia solution was added dropwise to this mixed sol with stirring to adjust the pH to 10, thereby aggregating ceria. Subsequently, drying and firing were performed in the same manner as in Example 1 to obtain a metal oxide particle.

Example 3

In this Example, a metal oxide particle comprising a core part relatively rich in alumina and a surface layer relatively rich in ceria is obtained from an alkali-stabilized alumina aqueous sol and an acid-stabilized ceria aqueous sol.

An alkali-stabilized alumina aqueous sol (isoelectric point: pH 4.8) and an acid-stabilized ceria aqueous sol (isoelectric point: pH 8.5) were mixed to give a molar ratio of 1:2 between alumina ($Al_2O_3$) and ceria ($CeO_2$). To this sol mixture, an aqueous nitric acid solution was added dropwise with stirring to adjust the pH to 3.0, thereby aggregating alumina. Thereafter, an aqueous ammonia solution was added dropwise to this mixed sol with stirring to adjust the pH to 10, thereby aggregating ceria. Subsequently, drying and firing were performed in the same manner as in Example 1 to obtain a metal oxide particle.

Example 4

In this Example, a metal oxide particle comprising a core part relatively rich in zirconia and a surface layer relatively rich in ceria is obtained from an acid-stabilized zirconia aqueous sol and an alkali-stabilized ceria aqueous sol.

An acid-stabilized zirconia aqueous sol (isoelectric point: pH 7.8) and an alkali-stabilized ceria aqueous sol (isoelectric point: pH 4.0) were mixed to give a molar ratio of 1:1 between zirconia ($ZrO_2$) and ceria ($CeO_2$). To this mixed sol, an aqueous ammonia solution was added dropwise with stirring to adjust the pH to 10, thereby aggregating zirconia. Thereafter, an aqueous nitric acid solution was added dropwise to this mixed sol with stirring to adjust the pH to 3.0, thereby aggregating ceria. Subsequently, drying and firing were performed in the same manner as in Example 1 to obtain a metal oxide particle.

Example 5

In this Example, a metal oxide particle comprising a core part relatively rich in titania and a surface layer relatively rich in ceria is obtained from an acid-stabilized titania aqueous sol and an alkali-stabilized ceria aqueous sol.

An acid-stabilized titania aqueous sol (isoelectric point: pH 7.9) and an alkali-stabilized ceria aqueous sol (isoelectric point: pH 4.0) were mixed to give a molar ratio of 1:1 between titania ($TiO_2$) and ceria ($CeO_2$). To this mixed sol, an aqueous ammonia solution was added dropwise with stirring to adjust the pH to 10, thereby aggregating titania. Thereafter, an aqueous nitric acid solution was added dropwise to this mixed sol with stirring to adjust the pH to 3.0, thereby aggregating ceria. Subsequently, drying and firing were performed in the same manner as in Example 1 to obtain a metal oxide particle.

Example 6

In this Example, a metal oxide particle comprising a core part relatively rich in alumina and a surface layer relatively rich in ceria is obtained from an acid-stabilized alumina aqueous sol and an alkali-stabilized ceria aqueous sol.

An acid-stabilized alumina aqueous sol (isoelectric point: pH 7.6) and an alkali-stabilized ceria aqueous sol (isoelectric point: pH 4.0) were mixed to give a molar ratio of 1:2 between alumina ($Al_2O_3$) and ceria ($CeO_2$). To this mixed sol, an aqueous ammonia solution was added dropwise with stirring to adjust the pH to 10, thereby aggregating alumina. Thereafter, an aqueous nitric acid solution was added dropwise to this mixed sol with stirring to adjust the pH to 3.0, thereby aggregating ceria. Subsequently, drying and firing were performed in the same manner as in Example 1 to obtain a metal oxide particle.

Comparative Example 1

In this Example, zirconia particles and ceria particles are mixed.

Zirconia particles and ceria particles were mixed to give a molar ratio of 1:1 between zirconia ($ZrO_2$) and ceria ($CeO_2$), and the mixed particles was mixed in a ball mill for 100 hours.

Comparative Example 2

In this Example, titania particles and ceria particles are mixed.

Titania particles and ceria particles were mixed to give a molar ratio of 1:1 between titania ($TiO_2$) and ceria ($CeO_2$), and the mixed particles was mixed in a ball mill for 100 hours.

Comparative Example 3

In this Example, alumina particles and ceria particles are mixed.

Alumina particles and ceria particles were mixed to give a molar ratio of 1:2 between alumina ($Al_2O_3$) and ceria ($CeO_2$), and the mixed particles was mixed in a ball mill for 100 hours.

Comparative Example 4

In this Comparative Example, a metal oxide particle comprising zirconia and ceria is obtained by using a coprecipitation process.

Cerium ammonium nitrate and zirconium oxynitrate dihydrate were added to distilled water to give a molar ratio of 1:1 between zirconium (Zr) and cerium (Ce). To this mixture, an aqueous ammonia solution was added dropwise to adjust the pH to 9 and cause precipitation. Subsequently, drying and firing were performed in the same manner as in Example 1 to obtain a metal oxide particle.

<Evaluation of Structure of Metal Oxide Particle>

The metal oxide particles obtained in Examples 1 to 6 and Comparative Examples 1 to 4 were examined for surface $CeO_2$ concentration by using the XPS (X-ray photoelectron spectroscopic) quantitative analysis. The results are shown in Table 1 below.

TABLE 1

Surface $CeO_2$ Concentration by XPS Quantitative Analysis

| | Metal oxide particles | Quantitative Value (atom %) |
|---|---|---|
| Ex. 1 | surface $CeO_2$-core $ZrO_2$ particles | 56% |
| Ex. 2 | surface $CeO_2$-core $TiO_2$ particles | 51% |
| Ex. 3 | surface $CeO_2$-core $Al_2O_3$ particles | 53% |
| Ex. 4 | surface $CeO_2$-core $ZrO_2$ particles | 51% |
| Ex. 5 | surface $CeO_2$-core $TiO_2$ particles | 49% |
| Ex. 6 | surface $CeO_2$-core $Al_2O_3$ particles | 47% |
| Comp. Ex. 1 | $CeO_2$ particles + $ZrO_2$ particles | 38% |
| Comp. Ex. 2 | $CeO_2$ particles + $TiO_2$ particles | 37% |
| Comp. Ex. 3 | $CeO_2$ particles + $Al_2O_3$ particles | 32% |
| Comp. Ex. 4 | $(Ce, Zr)O_x$ particles | 38% |

As apparent from Table 1, in the metal oxide particle obtained according to the process of the present invention, a relatively large amount of ceria is exposed to the surface in comparison with Comparative Examples 1 to 3 of mixing ceria particles with zirconia particles or the like and Comparative Example 4 of obtaining ceria-zirconia particles by coprecipitation, despite the same molar ratio between raw materials used.

EXAMPLES 7 TO 10 AND COMPARATIVE EXAMPLES 5 TO 8

The optimum contents of $CeO_2$ and $ZrO_2$ are examined in the following example. Both $CeO_2$ and $ZrO_2$ colloid particles in $CeO_2$ and $ZrO_2$ sols used have a particle diameter of 100 nm or less. The particle diameter of the particulate support produced is 6 μm or less. The Pt particle diameter supported was 3 nm or less.

Example 7

The catalyst of Example 7 comprises Pt (1% by weight) and a particulate support comprising a surface layer composed of $CeO_2$ and a core part composed of $ZrO_2$, the particulate support having a composition of $CeO_2:ZrO_2$=60:40 (mol %). Evaluation items are specific surface area, Pt particle diameter, HC-T50 and OSC. The catalyst was obtained as shown below.

An acid-stabilized $CeO_2$ sol (isoelectric point: pH 8.5, $CeO_2$ content: 15% by weight) and an alkali-stabilized $ZrO_2$ sol (isoelectric point: pH 3.5, $ZrO_2$ content: 10.2% by weight) were mixed to obtain a sol mixture having a $CeO_2:ZrO_2$ ratio of 60:40 (mol %). To the sol mixture, an aqueous $HNO_3$ solution was added to adjust the pH to 3.0 and then an aqueous $NH_3$ solution was added to the adjust the pH to 11.0. The resulting solution was dried at 120° C. for 24 hours, and the dried product was fired at 700° C. for 5 hours to obtain particulate supports.

The thus-obtained particulate supports were dispersed in distilled water which was in an amount of 6-fold weight, an aqueous dinitrodiamine platinum solution (Pt content: 4.4% by weight) was added thereto so that platinum is in an amount of 1% by weight based on the particulate support, and the resulting dispersion was stirred for 1 hour. Thereafter, the water content was removed by drying at 120° C. for 24 hours and the residue was fired at 500° C. for 2 hours. The obtained catalyst was shaped into a 1 mm-square pellet and used for the evaluation of performance.

Example 8

The catalyst of Example 8 comprises Pt (1% by weight) and a particulate support comprising a surface layer composed of $CeO_2$ and $Y_2O_3$ and a core part composed of $ZrO_2$ and $Y_2O_3$, the particulate support having a composition of $CeO_2:ZrO_2:Y_2O_3$=45:52:3 (mol %). Evaluation items are specific surface area, Pt particle diameter and HC-T50. Y is contained as an oxide. The catalyst was obtained as shown below.

An acid-stabilized $CeO_2$ sol (isoelectric point: pH 8.5, $CeO_2$ content: 15% by weight), an alkali-stabilized $ZrO_2$ sol (isoelectric point: pH 3.5, $ZrO_2$ content: 10.2% by weight) and a $Y_2O_3$ sol ($Y_2O_3$ content: 15% by weight) were mixed to obtain a sol mixture having a $CeO_2:ZrO_2:Y_2O_3$ ratio of 45:52:3 (mol %). To the sol mixture, an aqueous $HNO_3$ solution was added to adjust the pH to 3.0 and then an aqueous $NH_3$ solution was added to adjust the pH to 11.0. The resulting solution was dried at 120° C. for 24 hours, and the dried product was fired at 700° C. for 5 hours to obtain particulate supports.

The thus-obtained particulate supports were dispersed in distilled water which was in an amount of 6 times by weight, an aqueous dinitrodiamine platinum solution (Pt content: 4.4% by weight) was added thereto so that platinum is in an amount of 1% by weight based on the particulate support, and the resulting dispersion was stirred for 1 hour. Thereafter, the water content was removed by drying at 120° C. for 24 hours and the residue was fired at 500° C. for 2 hours. The obtained catalyst was shaped into a 1 mm-square pellet and used for the evaluation of performance.

Example 9

The catalyst of Example 9 comprises Pt (1% by weight) and a particulate support comprising a surface layer composed of $CeO_2$ and $Y_2O_3$ and a core part composed of $ZrO_2$ and $Y_2O_3$, the particulate support having a composition of $CeO_2:ZrO_2:Y_2O_3$=50:47:3 (mol %). Evaluation items are specific surface area, Pt particle diameter and HC-T50. Y is contained as an oxide. The catalyst was obtained as shown below.

An acid-stabilized $CeO_2$ sol (isoelectric point: pH 8.5, $CeO_2$ content: 15% by weight), an alkali-stabilized $ZrO_2$ sol (isoelectric point: pH 3.5, $ZrO_2$ content: 10.2% by weight) and a $Y_2O_3$ sol ($Y_2O_3$ content: 15% by weight) were mixed to obtain a sol mixture having a $CeO_2:ZrO_2:Y_2O_3$ ratio of 50:47:3 (mol %). To the sol mixture, an aqueous $HNO_3$ solution was added to adjust the pH to 3.0 and then an aqueous $NH_3$ solution was added to the adjust the pH to 11.0. The resulting solution was dried at 120° C. for 24 hours, and the dried product was fired at 700° C. for 5 hours to obtain particulate supports.

The thus-obtained particulate supports were dispersed in distilled water which was in an amount of 6 times by weight, an aqueous dinitrodiamine platinum solution (Pt content:

4.4% by weight) was added thereto so that platinum is in an amount of 1% by weight based on the particulate support, and the resulting dispersion was stirred for 1 hour. Thereafter, the water content was removed by drying at 120° C. for 24 hours and the residue was fired at 500° C. for 2 hours. The obtained catalyst was shaped into a 1 mm-square pellet and used for the evaluation of performance.

Example 10

The catalyst of Example 10 comprises Pt (1% by weight) and a particulate support comprising a surface layer composed of $CeO_2$ and $Y_2O_3$ and a core part composed of $ZrO_2$ and $Y_2O_3$, the particulate support having a composition of $CeO_2:ZrO_2:Y_2O_3=55:42:3$ (mol %). Evaluation items are specific surface area, Pt particle diameter and HC-T50. Y is contained as an oxide. The catalyst was obtained as shown below.

An acid-stabilized $CeO_2$ sol (isoelectric point: pH 8.5, $CeO_2$ content: 15% by weight), an alkali-stabilized $ZrO_2$ sol (isoelectric point: pH 3.5, $ZrO_2$ content: 10.2% by weight) and a $Y_2O_3$ sol ($Y_2O_3$ content: 15% by weight) were mixed to obtain a sol mixture having a $CeO_2:ZrO_2:Y_2O_3$ ratio of 55:42:3 (mol %). To the sol mixture, an aqueous $HNO_3$ solution was added to adjust the pH to 3.0 and then an aqueous $NH_3$ solution was added to adjust the pH to 11.0. The resulting solution was dried at 120° C. for 24 hours, and the dried product was fired at 700° C. for 5 hours to obtain particulate supports.

The thus-obtained particulate supports were dispersed in distilled water which was in an amount of 6 times by weight, an aqueous dinitrodiamine platinum solution (Pt content: 4.4% by weight) was added thereto so that platinum is in an amount of 1% by weight based on the particulate support, and the resulting dispersion was stirred for 1 hour. Thereafter, the water content was removed by drying at 120° C. for 24 hours and the residue was fired at 500° C. for 2 hours. The obtained catalyst was shaped into a 1 mm-square pellet and used for the evaluation of performance.

Comparative Example 5

The catalyst of Comparative Example 5 comprises Pt (1% by weight) and a particulate support composed of $ZrO_2$, the particulate support being composed only of a $ZrO_2$ powder. Evaluation items are specific surface area, Pt particle diameter and HC-T50. The catalyst was obtained as shown below.

The $ZrO_2$ powder was dispersed in distilled water which was in an amount of 6 times by weight, an aqueous dinitrodiamine platinum solution (Pt content: 4.4% by weight) was added thereto so that platinum is in an amount of 1% by weight based on the particulate support, and the resulting dispersion was stirred for 1 hour. Thereafter, the water content was removed by drying at 120° C. for 24 hours and the residue was fired at 500° C. for 2 hours. The obtained catalyst was shaped into a 1 mm-square pellet and used for the evaluation of performance.

Comparative Example 6

The catalyst of Comparative Example 6 comprises Pt (1% by weight) and a particulate support comprising a surface layer composed of $CeO_2$ and $Y_2O_3$ and a core part composed of $ZrO_2$ and $Y_2O_3$, the particulate support having a composition of $CeO_2:ZrO_2:Y_2O_3=25:72:3$ (mol %). Evaluation items are specific surface area, Pt particle diameter and HC-T50. Y is contained as an oxide. The catalyst was obtained as shown below.

An acid-stabilized $CeO_2$ sol (isoelectric point: pH 8.5, $CeO_2$ content: 15% by weight), an alkali-stabilized $ZrO_2$ sol (isoelectric point: pH 3.5, $ZrO_2$ content: 10.2% by weight) and a $Y_2O_3$ sol ($Y_2O_3$ content: 15% by weight) were mixed to obtain a sol mixture having a $CeO_2:ZrO_2:Y_2O_3$ ratio of 25:72:3 (mol %). To the sol mixture, an aqueous $HNO_3$ solution was added to adjust the pH to 3.0 and then an aqueous $NH_3$ solution was added to the adjust the pH to 11.0. The resulting solution was dried at 120° C. for 24 hours, and the dried product was fired at 700° C. for 5 hours to obtain particulate supports.

The thus-obtained particulate supports were dispersed in distilled water which was in an amount of 6-fold weight, an aqueous dinitrodiamine platinum solution (Pt content: 4.4% by weight) was added thereto so that platinum is in an amount of 1% by weight based on the particulate support, and the resulting dispersion was stirred for 1 hour. Thereafter, the water content was removed by drying at 120° C. for 24 hours and the residue was fired at 500° C. for 2 hours. The obtained catalyst was shaped into a 1 mm-square pellet and used for the evaluation of performance.

Comparative Example 7

A catalyst of Comparative Example 7 comprises Pt (1% by weight) and a particulate support comprising a surface layer composed of $CeO_2$ and $Y_2O_3$ and a core part composed of $ZrO_2$ and $Y_2O_3$, the particulate support having a composition of $CeO_2:ZrO_2:Y_2O_3=75:22:3$ (mol %). Evaluation items are specific surface area, Pt particle diameter and HC-T50. Y is contained as an oxide. The catalyst was obtained as shown below.

An acid-stabilized $CeO_2$ sol (isoelectric point: pH 8.5, $CeO_2$ content: 15% by weight), an alkali-stabilized $ZrO_2$ sol (isoelectric point: pH 3.5, $ZrO_2$ content: 10.2% by weight) and a $Y_2O_3$ sol ($Y_2O_3$ content: 15% by weight) were mixed to obtain a sol mixture having a $CeO_2:ZrO_2:Y_2O_3$ ratio of 75:22:3 (mol %) to give a sol mixture. To the sol mixture, an aqueous $HNO_3$ solution was added to adjust the pH to 3.0 and then an aqueous $NH_3$ solution was added to the adjust the pH to 11.0. The resulting solution was dried at 120° C. for 24 hours, and the dried product was fired at 700° C. for 5 hours to obtain a particulate support.

The thus-obtained particulate support was dispersed in distilled water which was in an amount of 6 times by weight, an aqueous dinitrodiamine platinum solution (Pt content: 4.4% by weight) was added thereto so that platinum is in an amount of 1% by weight based on the particulate support, and the resulting dispersion was stirred for 1 hour. Thereafter, the water content was removed by drying at 120° C. for 24 hours and the residue was fired at 500° C. for 2 hours. The obtained catalyst was shaped into a 1 mm-square pellet and used for the evaluation of performance.

Comparative Example 8

The catalyst of Comparative Example 8 comprises Pt (1% by weight) and a particulate support composed of $CeO_2$, the particulate support being composed only of a $CeO_2$ powder. Evaluation items are specific surface area, Pt particle diameter and HC-T50. The catalyst was obtained as shown below.

The $CeO_2$ powder was dispersed in distilled water which was in an amount of 6 times by weight, an aqueous dinitrodiamine platinum solution (Pt content: 4.4% by weight) was added thereto so that platinum is in an amount of 1% by weight based on the particulate support, and the resulting dispersion was stirred for 1 hour. Thereafter, the water content was removed by drying at 120° C. for 24 hours and the residue was fired at 500° C. for 2 hours. The obtained catalyst was shaped into a 1 mm-square pellet and used for the evaluation of performance.

<Evaluation>

The obtained exhaust gas purifying catalysts shaped into a 1 mm-square pellet were subjected to a durability test in which rich and lean gases each having a composition shown in Table 2 were passed therethrough at 1000° C. for 5 hours with switching over these gases every 60 seconds. This durability test was carried out before evaluation of all examples and comparative examples.

TABLE 2

| | Composition of gas | | | | | | |
|---|---|---|---|---|---|---|---|
| | $N_2$ (%) | $CO_2$ (%) | NO (ppm) | CO (%) | $C_3H_6$ (ppmC) *1 | $H_2$ (%) | $O_2$ (%) | $H_2O$ (%) |
| Rich Gas | balance | 10 | 2200 | 2.80 | 2500 | 0.27 | 0.77 | 10 |
| Lean Gas | balance | 10 | 2200 | 0.81 | 2500 | 0.00 | 1.70 | 10 |

*1: Concentration based only on the amount of carbon

Thereafter, through the catalyst, rich and lean gases each having a composition shown in Table 2 were passed by switching over these gases at 1 Hz while elevating the gas temperature, thereby determining the temperature where 50% of the $C_3H_6$ in the gas was purified by a catalyst (HC-T50). Also, CO (2%) and $O_2$ (1%) were passed by switching over therebetween every 60 minutes and, from the amount of $CO_2$ generated during passing $O_2$, OSC (oxygen storage capacity) ($O_2$ mol/$CeO_2$-1 mol %) was calculated.

The specific surface area (SSA) was measured by using a BET one-point method, and the Pt particle diameter was measured by a CO pulse adsorption method at −80° C.

Figure 3:
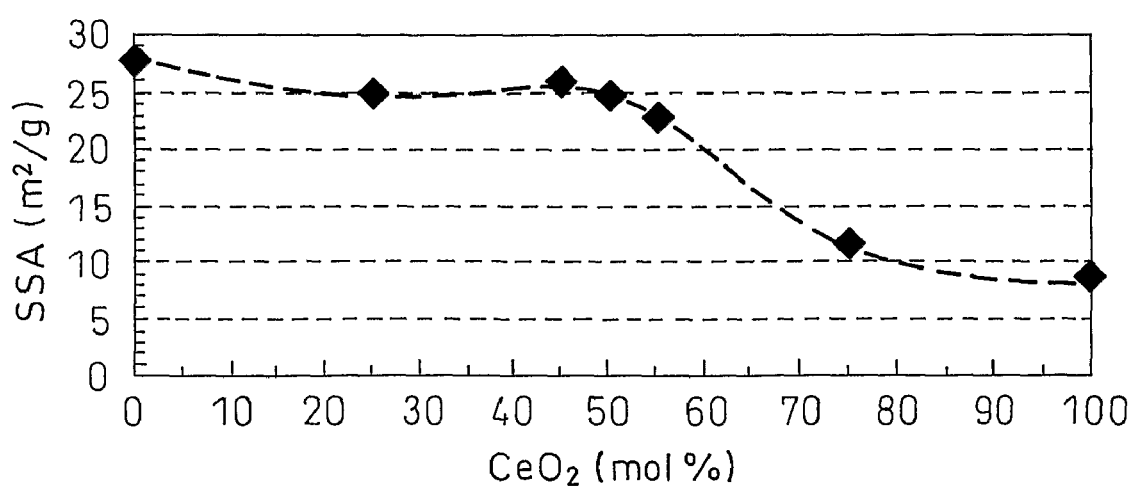
FIG. 3 is a view showing the relationship between the $CeO_2$ content and the specific surface area.
Figure 4:
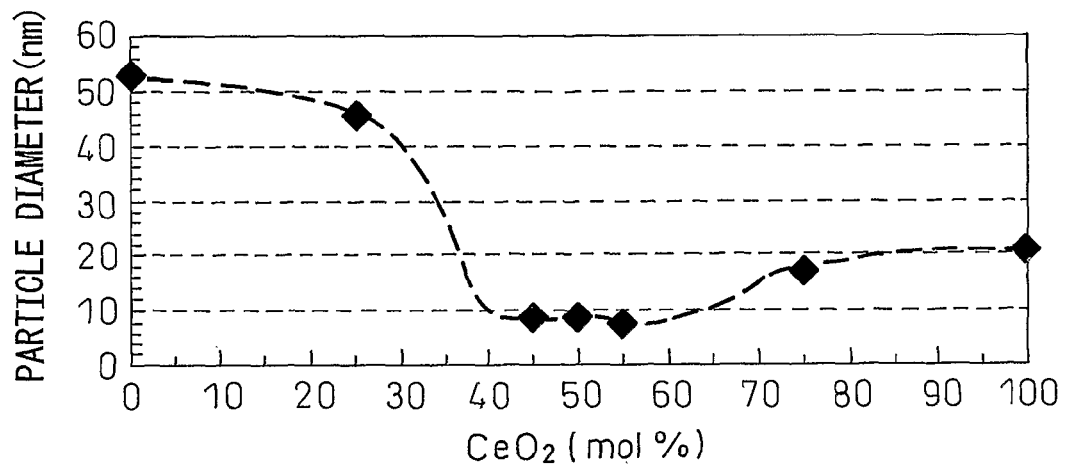
FIG. 4 is a view showing the relationship between the $CeO_2$ content and the Pt particle diameter.
Figure 5:
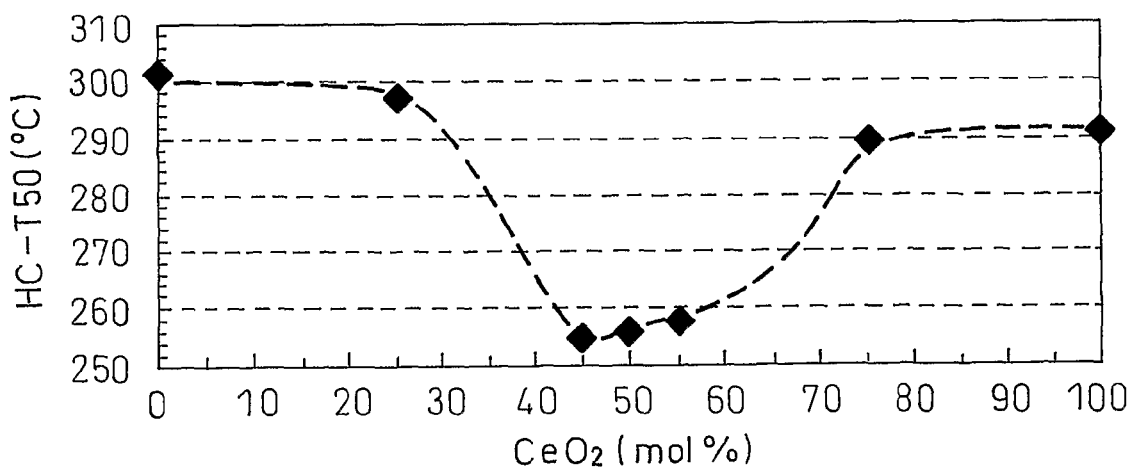
FIG. 5 is a view showing the relationship between the $CeO_2$ content and the catalyst performance (HC-T50).

The evaluation results of Examples 7 to 10 and Comparative Examples 5 to 8 are shown in Table 3 and FIGS. 3 to 5. In Table 3, $CeO_2$ content, SSA (specific surface area), Pt particle diameter and HC-T50 as an indicator of catalyst performance are shown. Also the relationship between the $CeO_2$ content and the SSA is shown in FIG. 3, the relationship between the $CeO_2$ content and the Pt particle diameter is shown in FIG. 4, and the relationship between the $CeO_2$ content and the HC-T50 is shown in FIG. 5, respectively.

TABLE 3

Results of change in content of $CeO_2$ and $ZrO_2$

| | Amount of $CeO_2$ (mol %) | SSA*1 ($m^2$/g) | Pt particle diameter (nm) | HC-T50 (° C.) |
|---|---|---|---|---|
| Ex. 7 | 60 | 18 | 15 | 287 |
| Ex. 8 | 45 | 26 | 9 | 255 |
| Ex. 9 | 50 | 25 | 9 | 256 |
| Ex. 10 | 55 | 23 | 8 | 258 |
| Comp. Ex. 5 | 0 | 28 | 53 | 301 |
| Comp. Ex. 6 | 25 | 25 | 46 | 297 |
| Comp. Ex. 7 | 75 | 12 | 17 | 289 |
| Comp. Ex. 8 | 100 | 9 | 21 | 291 |

*1: specific surface area measured by using a BET one-point method
(Note)
In Example 7, $Y_2O_3$ is not contained and the composition is different from other examples and, therefore, the resulting data are not plotted in FIGS. 3 to 5.

The particulate support of Example 7 is composed only of $CeO_2$ and $ZrO_2$, while the particulate supports of Examples 8 to 10 and Comparative Examples 5 to 8 comprise a surface layer and a core part composed of $CeO_2$ and $ZrO_2$ plus $Y_2O_3$, respectively. It is impossible to simply compare data of Example 7 with the others, and therefore the results of Example 7 are not plotted in FIGS. 3 to 5.

As is apparent from the results shown in Table 3, HC-T50 of Example 7 is lower than that of Comparative Examples even though $Y_2O_3$ is not added. Further, it is apparent that the addition of $Y_2O_3$ increases the specific surface area and decreases the Pt particle diameter and HC-T50, i.e. improves all evaluation items.

As is apparent from the results shown in FIGS. 4 and 5, when the $CeO_2$ content in the particulate support is 40 to 65 mol %, the effect of improving heat resistance due to $ZrO_2$ and the effect of preventing sintering of the noble metal due to $CeO_2$ are preferably exerted at the same time, and also OSC is improved by $CeO_2$, thereby excellent properties suited for exhaust gas purifying catalyst are obtained. As is apparent from the results shown in FIG. 5, when the particulate support containing 3 mol % of $Y_2O_3$ has a $CeO_2$ content of 45 to 55 mol %, HC-T50 is the lowest and the resulting catalyst is excellent.

EXAMPLES 11 TO 12 AND COMPARATIVE EXAMPLES 9 TO 10

The effect due to the additive element will now be examined. Both $CeO_2$ and $ZrO_2$ colloid particles in the $CeO_2$ $ZrO_2$ sols used have a particle diameter of 100 nm or less. The particle diameter of the particulate support obtained is 5 μm or less. The Pt particle diameter supported was 3 nm or less.

Example 11

The catalyst of the Example 11 comprises Pt (1% by weight) and a particulate support comprising a surface layer composed of $CeO_2$, $Nd_2O_3$ and $Y_2O_3$ and a core part composed of $ZrO_2$ and $Y_2O_3$, the particulate support having a composition of $CeO_2$:$ZrO_2$:$Y_2O_3$:$Nd_2O_3$=58:38:2:2 (mol %). Evaluation items are specific surface area, Pt particle diameter, HC-T50 and OSC. Y and Nd are contained as oxides. The catalyst was obtained as shown below.

An acid-stabilized $CeO_2$ sol (isoelectric point: pH 8.5, $CeO_2$ content: 15% by weight), an alkali-stabilized $Y_2O_3$—$ZrO_2$ composite sol ($Y_2O_3$ content: 5% by weight, composite sol content: 10.2% by weight) and neodymium nitrate were mixed to obtain a sol mixture having a $CeO_2$:$ZrO_2$:$Y_2O_3$:$Nd_2O_3$ ratio of 58:38:2:2 (mol %). To the sol mixture, an aqueous $HNO_3$ solution was added to adjust the pH to 3.0 and then an aqueous $NH_3$ solution was added to the adjust the pH to 11.0. The resulting solution was dried at 120° C. for 24 hours, and the dried product was fired at 700° C. for 5 hours to obtain particulate supports.

The thus-obtained particulate supports were dispersed in distilled water which was in an amount of 6-fold weight, an aqueous dinitrodiamine platinum solution (Pt content: 4.4% by weight) was added thereto so that platinum is in an amount of 1% by weight based on the particulate support, and the resulting dispersion was stirred for 1 hour. Thereafter, the water content was removed by drying at 120° C. for 24 hours and the residue was fired at 500° C. for 2 hours. The obtained catalyst was shaped into a 1 mm-square pellet and used for the evaluation of performance.

Example 12

The catalyst of Example 12 comprises Pt (1% by weight) and a particulate support comprising a surface layer composed of $CeO_2$ and $Y_2O_3$ and a core part composed of $CeO_2$, $ZrO_2$ and $Y_2O_3$, the particulate support having a composition of $CeO_2:ZrO_2:Y_2O_3=58:38:4$ (mol %). Evaluation items are specific surface area, Pt particle diameter, HC-T50 and OSC. Y is contained as an oxide. The catalyst was obtained as shown below.

An acid-stabilized $CeO_2$ sol (isoelectric point: pH 8.5, $CeO_2$ content: 15% by weight), an alkali-stabilized $Y_2O_3$—$ZrO_2$ composite sol ($Y_2O_3$ content: 5% by weight, composite sol content: 10.2% by weight) and a $Y_2O_3$ sol ($Y_2O_3$ content: 15% by weight) were mixed to obtain a sol mixture having a $CeO_2:ZrO_2:Y_2O_3$ ratio of 58:38:4 (mol %) to give a sol mixture. To the sol mixture, an aqueous $HNO_3$ solution was added to adjust the pH to 3.0 and then an aqueous $NH_3$ solution was added to the adjust the pH to 11.0. The resulting solution was dried at 120° C. for 24 hours, and the dried product was fired at 700° C. for 5 hours to obtain particulate supports.

The thus-obtained particulate supports were dispersed in distilled water which was in an amount of 6 times by weight, an aqueous dinitrodiamine platinum solution (Pt content: 4.4% by weight) was added thereto so that platinum is in an amount of 1% by weight based on the particulate support, and the resulting dispersion was stirred for 1 hour. Thereafter, the water content was removed by drying at 120° C. for 24 hours and the residue was fired at 500° C. for 2 hours. The obtained catalyst was shaped into a 1 mm-square pellet and used for the evaluation of performance.

Comparative Example 9

The catalyst of Comparative Example 9 comprises Pt (1% by weight) and a particulate support composed of $CeO_2$, $ZrO_2$ and $Nd_2O_3$, the particulate support having a composition of $CeO_2:ZrO_2:Nd_2O_3=58:38:4$ (mol %). Evaluation items are specific surface area, Pt particle diameter, HC-T50 and OSC. Nd is contained as an oxide. The catalyst was obtained as shown below.

To distilled water, cerium nitrate, zirconium oxynitrate and neodymium nitrate were added, and dissolved with stirring to obtain a mixture having a Ce:Zr:Nd ratio of 58:38:4 (mol %). To the mixture, an aqueous $NH_3$ solution was added to the adjust the pH to 9.0. The resulting solution was dried at 120° C. for 24 hours, and the dried product was fired at 700° C. for 5 hours to obtain particulate supports.

The thus-obtained particulate supports were dispersed in distilled water which was in an amount of 6 times by weight, an aqueous dinitrodiamine platinum solution (Pt content: 4.4% by weight) was added thereto so that platinum is in an amount of 1% by weight based on the particulate support, and the resulting dispersion was stirred for 1 hour. Thereafter, the water content was removed by drying at 120° C. for 24 hours and the residue was fired at 500° C. for 2 hours. The obtained catalyst was shaped into a 1 mm-square pellet and used for the evaluation of performance.

Comparative Example 10

The catalyst of Comparative Example 10 comprises Pt (1% by weight) and a particulate support composed of $CeO_2$, $ZrO_2$ and $Y_2O_3$, the particulate support having a composition of $CeO_2:ZrO_2:Y_2O_3=58:38:4$ (mol %). Evaluation items are specific surface area, Pt particle diameter, HC-T50 and OSC. Y is added as an oxide. The catalyst was obtained as shown below.

To distilled water, cerium nitrate, zirconium oxynitrate and yttrium nitrate were added, and dissolved with stirring to obtain a mixture having a Ce:Zr:Y ratio of 58:38:4 (mol %). To the mixture, an aqueous $NH_3$ solution was added to the adjust the pH to 9.0. The resulting solution was dried at 120° C. for 24 hours, and the dried product was fired at 700° C. for 5 hours to obtain particulate supports.

The thus-obtained particulate supports were dispersed in distilled water which was in an amount of 6 times by weight, an aqueous dinitrodiamine platinum solution (Pt content: 4.4% by weight) was added thereto so that platinum is in an amount of 1% by weight based on the particulate support, and the resulting dispersion was stirred for 1 hour. Thereafter, the water content was removed by drying at 120° C. for 24 hours and the residue was fired at 500° C. for 2 hours. The obtained catalyst was shaped into a 1 mm-square pellet and used for the evaluation of performance.

<Evaluation>

Figure 6:
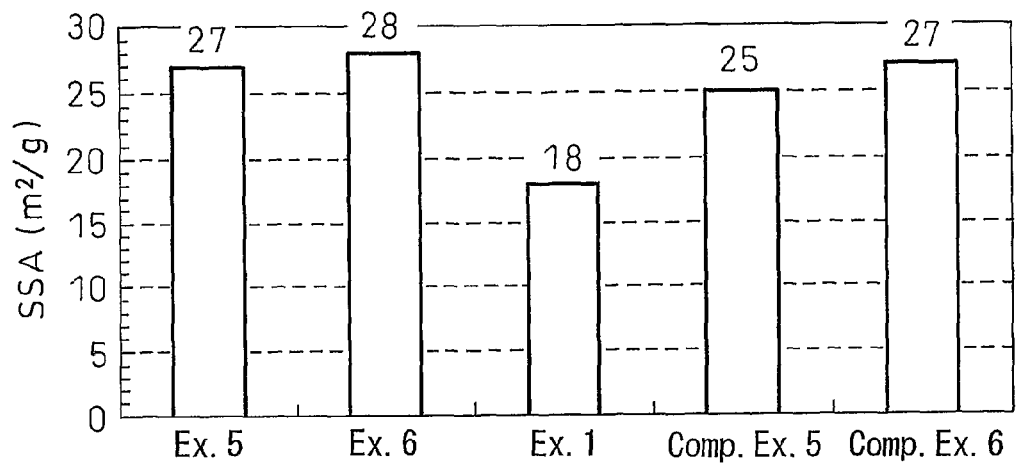
FIG. 6 is a view showing the relationship between the additive element and the specific surface area.
Figure 7:
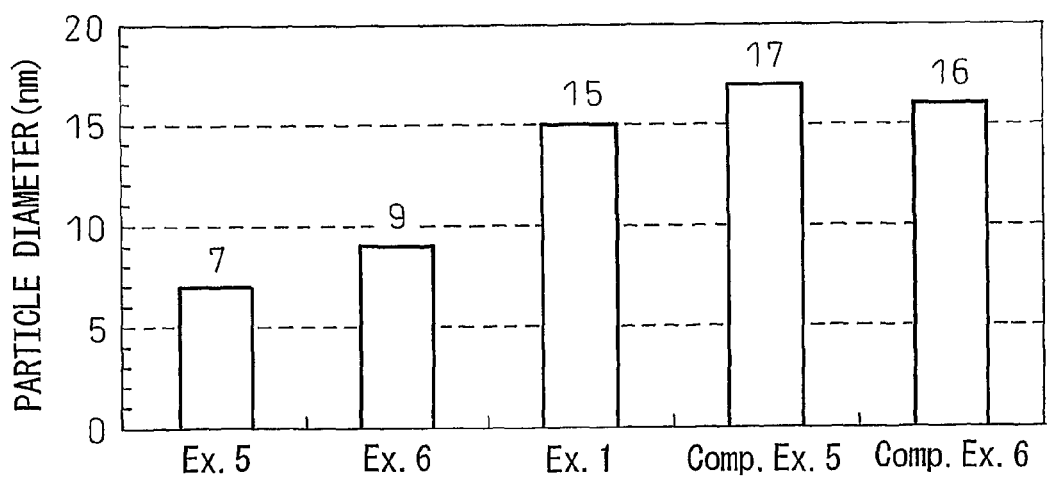
FIG. 7 is a view showing the relationship between the additive element and the Pt particle diameter.
Figure 8:
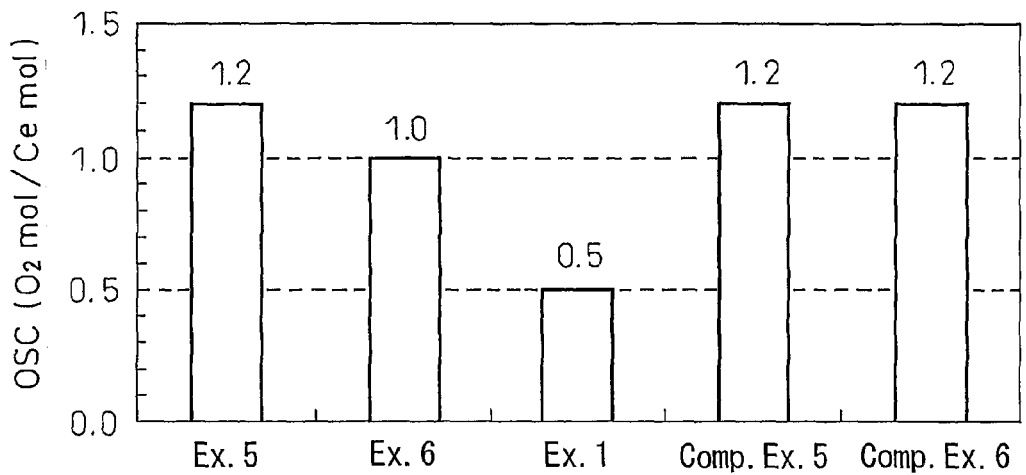
FIG. 8 is a view showing the relationship between the additive element and the catalyst performance (OSC).
Figure 9:
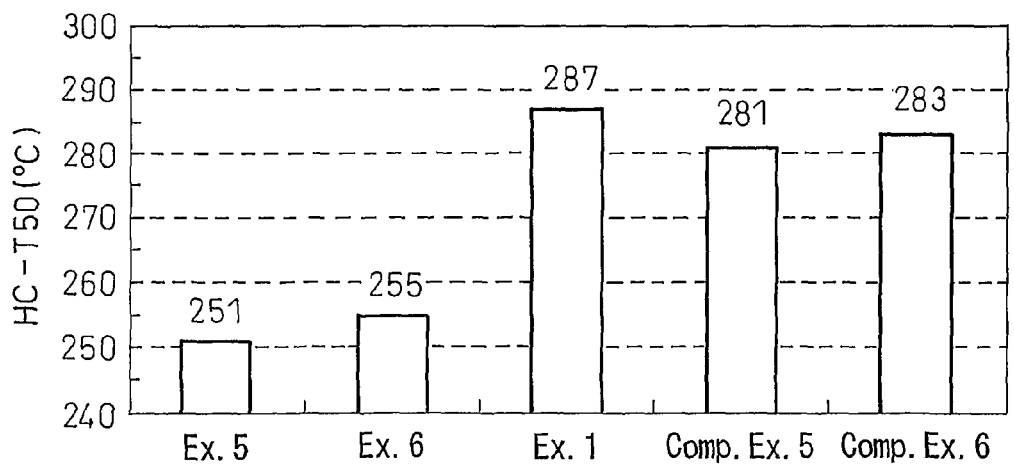
FIG. 9 is a view showing the relationship between the additive element and the catalyst performance (HC-T50).

The catalysts of Examples 7, 11 and 12, and Comparative Examples 9 and 10 were evaluated as described for the above Examples 7 to 10 and Comparative Examples 5 to 8. The results obtained are shown in Table 4 and FIGS. 6 to 9. In Table 4, SSA (specific surface area), Pt particle diameter, OSC and HC-T50 as an indicator of catalyst performance are shown. Also the relationship between the structure of the support and the additive element, and the change in SSA is shown in FIG. 6, the relationship between the structure of the support and the additive element, and the change in Pt particle diameter is shown in FIG. 7, the relationship between the structure of the support and the additive element, and the change in OSC is shown in FIG. 8, and the relationship between the structure of the support and the additive element, and the change in HC-T50 is shown in FIG. 9, respectively.

TABLE 4

Results of effect due to additive element

| | Composition | SSA*1 ($m^2/g$) | Pt particle diameter (nm) | OSC ($O_{2mol}/Ce_{mol}$) | HC-T50 (° C.) |
|---|---|---|---|---|---|
| Ex. 11 | Surface layer (Ce, Nd, Y)$O_x$ – Core part (Zr, Y)$O_x$ | 27 | 7 | 1.2 | 251 |
| Ex. 12 | Surface layer (Ce, Y)$O_x$ – Core part (Zr, Y)$O_x$ | 28 | 9 | 1.0 | 255 |
| Ref. (Ex. 7) | Surface layer $CeO_2$ – Core part $ZrO_2$ | 18 | 15 | 0.5 | 287 |
| Comp. Ex. 9 | (Ce, Zr, Nd)$O_x$ | 25 | 17 | 1.2 | 281 |
| Comp. Ex. 10 | (Ce, Zr, Y)$O_x$ | 27 | 16 | 1.2 | 283 |

*1: specific surface area measured by using a BET one-point method

First, the results of Examples 7, 11 and 12 were analyzed. The particulate support of Example 12 is a particulate support in which $Y_2O_3$ is added to the surface layer and the core part of the particulate support of Example 1. In Example 12, as compared with Example 1, sintering of Pt is further prevented and the Pt particle diameter decreases to 10 nm or less, and also OSC is more improved, and thus HC-T50 as an indicator of catalyst performance further decreases. In Example 11, $Y_2O_3$ is added to the surface layer and the core part of the particulate support and further $Nd_2O_3$ is added to the surface layer. As a result of the addition of $Nd_2O_3$, in Example 11, as compared with Example 12, the Pt particle diameter decreases, and OSC is improved, and thus HC-T50 as an indicator of catalyst performance further decreases. As is apparent from the above descriptions, catalyst performance is more excellent when $Y_2O_3$ and $Nd_2O_3$ are added to the surface layer and $Y_2O_3$ is added to the core part of the support for exhaust gas purifying catalyst. In addition to Y and Nd, the same effect can be exerted by the addition of alkali earth metals such as Mg, Ca, Sr and Ba, and rare earths such as La, Pr, Sm, Eu and Gd.

Next, the results of Example 11 and 12 and Comparative Examples 9 and 10 were analyzed. Although the difference in OSC is not confirmed, the surface layer of the particulate support of Examples 11 and 12 is composed of $CeO_2$ and therefore, sintering of Pt is prevented and the Pt particle diameter is 10 nm or less. As a result, HC-T50 as an indicator of catalyst performance decreases. Thus, it is apparent that, when using a support, for a exhaust gas purifying catalyst, comprising a surface layer and a core part, the resulting catalyst is excellent in properties at high temperature as compared with a support composed only of a composite of plural oxides.

The invention claimed is:

1. A process for producing a metal oxide particle comprising a core part and a surface layer differing in the composition, the process comprising:
    providing a sol containing at least a population of first colloid particles and a population of second colloid particles differing in the isoelectric point with each other,
    adjusting the pH of said sol to be closer to the isoelectric point of said population of first colloid particles than to the isoelectric point of said population of second colloid particles, thereby aggregating said population of first colloid particles,
    adjusting the pH of said sol to be closer to the isoelectric point of said population of second colloid particles than to the isoelectric point of said population of first colloid particles, thereby aggregating said population of second colloid particles onto said population of first colloid particles aggregated, and
    drying and firing the obtained aggregate.

2. The process according to claim 1, wherein the pH of said sol is changed to pass the isoelectric point of said population of first colloid particles, thereby aggregating said population of first colloid particles.

3. The process according to claim 1, wherein the pH of said sol is changed to pass the isoelectric point of said population of second colloid particles, thereby aggregating said population of second colloid particles.

4. The process according to claim 1, wherein said population of first colloid particles and said population of second colloid particles each is independently selected from the group consisting of alumina, ceria, zirconia and titania colloid particles.

5. The process according to claim 4, wherein said population of first colloid particles is zirconia, alumina or titania, and said population of second colloid particles is ceria.

6. An exhaust gas purifying catalyst for internal combustion engine, comprising a particulate support and a noble metal supported thereon,
    wherein the particulate support comprises a core part and a surface layer, a molar fraction of zirconium constituting zirconia in the core part being higher than a molar fraction of zirconium constituting zirconia in the surface layer, and a molar fraction of cerium constituting ceria in the surface layer being higher than a molar fraction of cerium constituting ceria in the core part;
    wherein said core part and said surface layer each comprises a plurality of primary particles;
    wherein the composition of the boundary between said core part and said surface layer is gradually changing; and
    wherein the content of ceria in the particulate support being 40 to 65 mol %.

7. The exhaust gas purifying catalyst for internal combustion engine according to claim 6, wherein the content of $CeO_2$ in the particulate support is 45 to 55 mol %.

8. The exhaust gas purifying catalyst for internal combustion engine according to claim 6, wherein the surface layer comprises at least one element selected from the group consisting of alkaline earth metals and rare earths.

9. The exhaust gas purifying catalyst for internal combustion engine according to claim 8, wherein the element comprised in the surface layer is at least one element of Y and Nd.

10. The exhaust gas purifying catalyst for internal combustion engine according to claim 6, wherein the core part comprises at least one element selected from the group consisting of alkaline earth metals and rare earths.

11. The exhaust gas purifying catalyst for internal combustion engine according to claim 10, wherein the element comprised in the core part is Y.

12. The process according to claim 1, wherein the difference between the isoelectric points of the population of first colloid particles and the population of second colloid particles is 3 or more.

* * * * *